July 2, 1940.  D. TURANO  2,206,243
METHOD OF SHEARING FURS
Filed Dec. 9, 1939  2 Sheets-Sheet 1
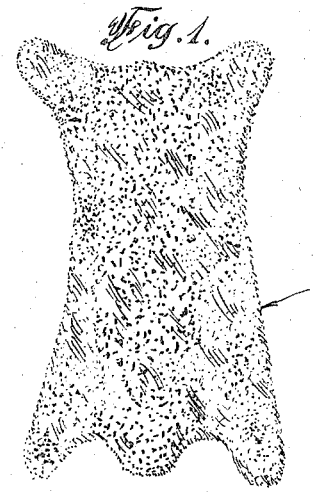
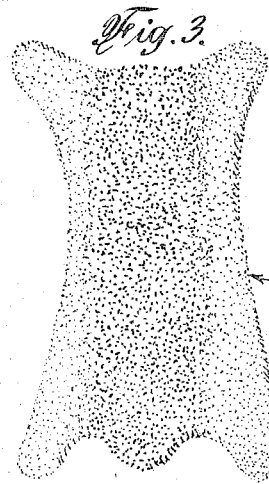
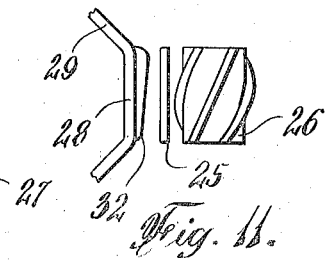
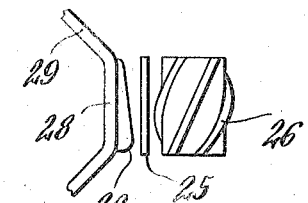
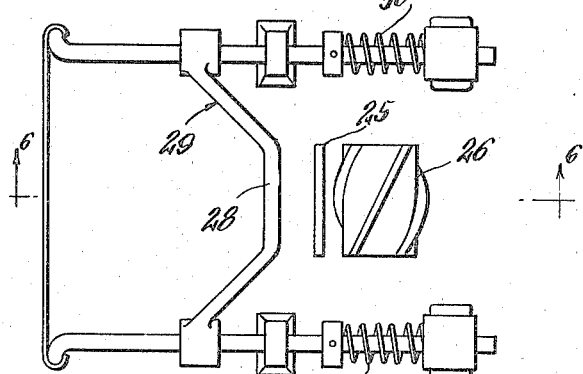
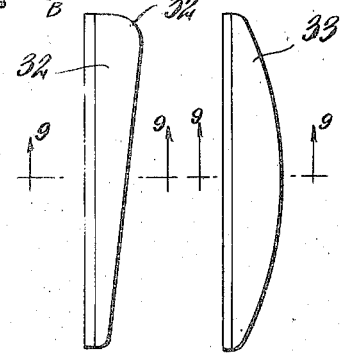
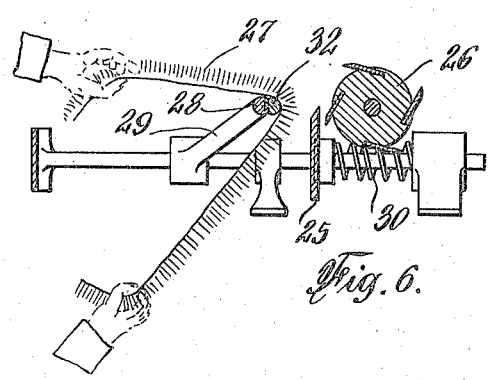
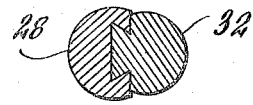
INVENTOR
Dominick Turano
BY
ATTORNEY July 2, 1940.                D. TURANO                2,206,243
                       METHOD OF SHEARING FURS
               Filed Dec. 9, 1939           2 Sheets-Sheet 2

INVENTOR
Dominick Turano
BY
ATTORNEY

Patented July 2, 1940

2,206,243

UNITED STATES PATENT OFFICE 2,206,243

METHOD OF SHEARING FURS

Dominick Turano, Brooklyn, N. Y.

Application December 9, 1939, Serial No. 308,404

1 Claim. (Cl. 149—28)

The present invention relates to a method for shearing furs.

An object of this invention is to provide a novel and improved method for shearing furs so as to enhance their appearance and produce pleasing shading and design effects.

Another object hereof is to produce a novel and improved method for shearing seamed furs to remove all abruptness along the seam line.

A further object hereof is to provide a novel and improved method whereby the abruptness occurring along the seam lines of newly manufactured fur garments, may be easily removed.

Another object of this invention is to provide a novel and improved method of the nature stated, which is simple to practice and use, and efficient in carrying out the purposes for which they are intended.

Other objects will become manifest as the disclosure proceeds.

In the accompanying drawings forming part of this application, similar characters of reference indicate corresponding parts in all the views.

Fig. 1 represents a fur skin, as for instance beaver, showing its actual appearance when as yet unsheared, presenting a dark longitudinal ventre lane with haphazard shading along the surface of the pelt and a tinted fringe along the longitudinal margins.

Fig. 2 is an end view of Fig. 1.

Fig. 3 represents said fur skin after being sheared in accordance with the present invention, whereby in appearance the pelt presents lighter outer longitudinal regions gradually becoming darker towards the centre line.

Fig. 4 is an end view of Fig. 3.

Fig. 5 is a diagrammatic plan view of an ordinary fur shearing machine.

Fig. 6 is a section taken at line 6—6 in Fig. 5, equipped with an embodiment of the present invention.

Figs. 7 and 8 show attachments I have devised to accomplish the purposes of this invention, which are adapted to be mounted onto the machine shown in Fig. 5, by the use of dove-tail joint construction for example. Of course, other modes of attachment may be employed.

Fig. 9 shows a section taken at lines 9—9 in either of Figs. 7 and 8.

Figs. 10 and 11 show diagrammatically, the article illustrated in Fig. 7, in different positions with respect to the shearing line of the blades of the machine.

Figure 13:
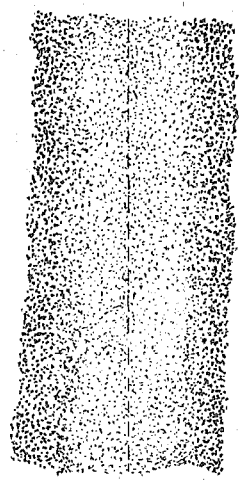
Fig. 13 represents a pelt as of Fig. 3, which has been cut along the centre line of its central longitudinal dark region and stitched along the outer edges, whereby in appearance it represents dark outer longitudinal regions gradually becoming lighter towards the seam line.
Figure 12:
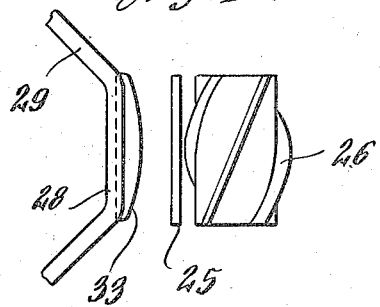
Fig. 12 shows diagrammatically, the article illustrated in Fig. 8, set in position with respect to said shearing line.

In the drawings the numerals 25 and 26 indicate the stationary and revolving blades respectively of a commonly used fur shearing machine which is associated with a suction means, to facilitate shearing of the hairs of a fur piece or pelt 27, straddling the forward portion 28 of the bar 29; the ends of which pelt are held in the operator's hands to be pulled by him successively whereby a longitudinal lane is sheared; the body of the operator causing the rod 29 to shift towards the blades against the action of spring 30, in order to contact or withdraw the pelt for or from blade action. Shifting the pelt 27 along forward portion 28 of the bar 29, after several such pulls, permits the shearing of successively adjacent lanes until all the hair of the pelt is sheared. Portion 28 is of course parallel to the line of shear so that all the hair of the pelt be sheared to a uniform length.

Figure 16:
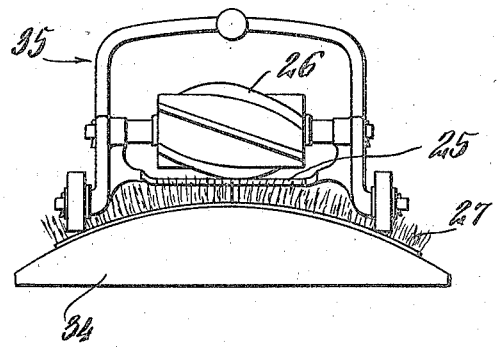
Fig. 16 shows diagrammatically a front view of a modified means for practicing the present invention. In the machine illustrated in previous figures, the pelt is shifted with respect to the shearing blades, while in the set up in this Fig. 16, the pelt is maintained stationary and the shearing blades are moved thereacross.

Instead of "feeding" the pelt across the shearing blades, the shearing means may be moved in "lawn-mower" fashion across a tacked-down pelt as shown in Fig. 16, with the pelt lying on a single plane surface. Although such is not specifically shown, it can be readily understood from the illustration.

Although I refer herein principally to my experiences with beaver fur to explain this invention, I shall not be deemed limited thereto, for of course, other species of fur may be likewise treated as herein taught to accomplish similar or other pleasing results.

Especially with beaver fur, the unsheared pelt is unfit for sylish garment manufacture. As explained, its appearance is marred by haphazard shading and even by marginal lanes of hairs which have reddish colored tips. Shearing all hair to uniform length, helps a little, but lighter shades occur nearer the roots of the hairs. I therefore bevel the longitudinal end lanes 31 of the pelt 27 along planes "B" after the uniform length shearing along plane "A" in order to accomplish the beautifully resulting appearance explained for Fig. 3. To accomplish such bevel shearing along the longitudinal margins of the fur piece, I permit shearing therealong with member 32 mounted on portion 28, for said member presents the pelt in taper relation to the shearing line of the blades 25 and 26 of the machine. The hairs over the higher end 32' of said member will be shown very low, and gradually higher will the inward longitudinal lines of hairs be shorn, hence effecting the beveling of the longitudinal edges of the pelt 27 to produce the condition described for the Fig. 3. Of course, only the outer longitudinal edges of the fur piece are so treated; such edge lanes being of the belly of the animal. It is obvious that the member 32 is reversely mounted for opposite edge treatment; such positions being indicated in the Figs. 10 and 11.

Figure 14:
Fig. 14 is an end view of Fig. 13, showing an abruptness at the seam line due to difference in hair lengths at the joined edges of the seamed pieces.
Figure 15:
Fig. 15 is the same end view after the pelt has been dealt with in accordance with the present invention, whereby said abruptness has been removed.
Figure 18:
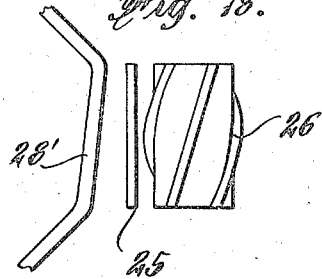
Fig. 18 is a modified form of block, that is, one of many forms which may be used in place of the block shown employed in Fig. 16.
Figure 17:
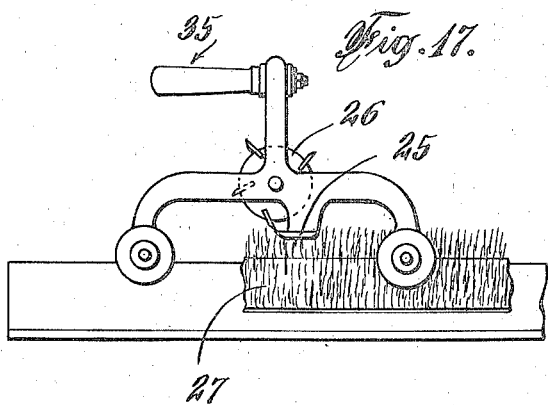
Fig. 17 is a side view of Fig. 16.

With the fur piece presenting a convex arcual surface with respect to the shearing line of the blades as is accomplished by use of member 33 mounted on rod portion 28, the abruptness occurring along the seam line 38 explained for Fig. 14 is removed, and the result illustrated in Fig. 15 is attained. Even the seams of a finished garment may be subjected to such shearing operation.

The numeral 34 presents a form having an upward convex surface its entire length in order that the results described can be accomplished by moving the shearing apparatus 35 over the fur piece tacked to said form, instead of moving the fur piece with respect to the shearing blades as heretofore explained.

Many different effects of shading and design can be effected by use of a block of different cross sections as 34' for instance met in large wooden mouldings having a multi-planer top surface as in 36. Here the fur piece 27 would need be maintained by tacking or otherwise in full surface contact with the form 34' during shearing.

Figure 19:
Fig. 19 shows diagrammatically pertinent parts of a shearing machine in a modified relation whereby the present invention is carried out.

For beveling as explained, the bar 29 may be made so that it could be shifted to a position as shown in Fig. 19 whereby portion 28' thereof is in angular relation with respect to the shearing line of the machine.

This invention is capable of numerous forms and various applications without departing from the essential features thereof. It is therefore desired and intended that the specific embodiments described herein be deemed illustrative and not restrictive, and that the patent shall cover all features of patentable novelty herein disclosed; reference being had to the following claim rather than to the specific practices herein set forth to indicate the scope of this invention.

I claim:

The method of shearing a pelt of a beaver type, in which the hairs vary in hue across the skin and in which the hairs of the belly portion vary in hue along their length, comprising shearing the hairs of said pelt to substantially equal lengths and then shearing the hairs on the belly portions on a bevel, whereby the belly portions are changed to produce a different appearing fur.

DOMINICK TURANO.